United States Patent
Sun et al.

(10) Patent No.: US 11,333,012 B2
(45) Date of Patent: May 17, 2022

(54) HYBRID FRACTURING TREATMENT WITH NATURAL GAS

(71) Applicant: HALLIBURTON ENERGY SERVICES, INC., Houston, TX (US)

(72) Inventors: Hong Sun, Houston, TX (US); Dong Shen, The Woodlands, TX (US); Philip Nguyen, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 17/252,072

(22) PCT Filed: Aug. 29, 2018

(86) PCT No.: PCT/US2018/048497
§ 371 (c)(1),
(2) Date: Dec. 14, 2020

(87) PCT Pub. No.: WO2020/046288
PCT Pub. Date: Mar. 5, 2020

(65) Prior Publication Data
US 2021/0215028 A1 Jul. 15, 2021

(51) Int. Cl.
*E21B 43/267* (2006.01)
*E21B 43/25* (2006.01)
*C09K 8/66* (2006.01)
*C09K 8/68* (2006.01)
(Continued)

(52) U.S. Cl.
CPC .......... *E21B 43/267* (2013.01); *C09K 8/665* (2013.01); *C09K 8/685* (2013.01); *C09K 8/703* (2013.01); *C09K 8/80* (2013.01); *E21B 43/255* (2013.01)

(58) Field of Classification Search
CPC ..... E21B 43/267; E21B 43/255; C09K 8/665; C09K 8/703; C09K 8/80
See application file for complete search history.

(56) References Cited

U.S. PATENT DOCUMENTS 5,711,376 A * 1/1998 Sydansk ............... C09K 8/703
166/308.6
8,342,246 B2 1/2013 Vandor
(Continued)

FOREIGN PATENT DOCUMENTS

WO WO 2012/097426 A1 7/2012
WO WO 2014/163738 A1 10/2014
(Continued)

OTHER PUBLICATIONS

International Search Report and Written Opinion received in International Application No. PCT/US2018/048497, dated May 23, 2019, 11 pages.
(Continued)

*Primary Examiner* — Silvana C Runyan
(74) *Attorney, Agent, or Firm* — Haynes and Boone, LLP (57) ABSTRACT

Methods of fracturing a subterranean formation containing a hydrocarbon include introducing a first fracturing fluid that includes natural gas into the formation at a rate and pressure sufficient to create a complex fracture in the formation; introducing a second fracturing fluid into the formation, wherein the second fracturing fluid comprises water, a gelling agent, a foaming agent, natural gas, and proppant particulates; and allowing the second fracturing fluid to transport a portion of the proppant particulates into the complex fracture.

20 Claims, 3 Drawing Sheets

(51) Int. Cl.
*C09K 8/70* (2006.01)
*C09K 8/80* (2006.01)

(56) References Cited

U.S. PATENT DOCUMENTS

| | | | |
|---|---|---|---|
| 9,790,775 B2 | 10/2017 | Joseph et al. | |
| 2007/0023184 A1* | 2/2007 | Jackson | E21B 43/267 166/250.07 |
| 2008/0142226 A1* | 6/2008 | Wilson | E21B 37/06 166/312 |
| 2013/0220605 A1 | 8/2013 | Vandor | |
| 2013/0284437 A1* | 10/2013 | Nguyen | E21B 43/267 166/280.1 |
| 2013/0306315 A1 | 11/2013 | Kaminsky et al. | |
| 2014/0000899 A1 | 1/2014 | Nevison | |
| 2014/0262263 A1 | 9/2014 | Yudin et al. | |
| 2015/0345268 A1 | 12/2015 | Bryant et al. | |
| 2016/0333254 A1 | 11/2016 | Friesen et al. | |
| 2017/0158952 A1* | 6/2017 | Nguyen | C09K 8/80 |
| 2017/0190960 A1 | 7/2017 | Tang et al. | |
| 2017/0298268 A1* | 10/2017 | Babcock | E21B 43/164 |

FOREIGN PATENT DOCUMENTS

| | | |
|---|---|---|
| WO | WO 2015/181028 A1 | 12/2015 |
| WO | WO 2018/017110 A1 | 1/2018 |

OTHER PUBLICATIONS

Crawford, Mark, "Taking the Hydro Out of Hydraulic Fracturing", Mechanical Engineering, Mar. 2015, vol. 137, No. 3. (6 pgs.).

* cited by examiner

HYBRID FRACTURING TREATMENT WITH NATURAL GAS

CROSS-REFERENCE TO RELATED APPLICATION

The present application is a U.S. National Stage patent application of International Patent Application No. PCT/US2018/048497, filed on Aug. 29, 2018, the benefit of which is claimed and the disclosure of which is incorporated herein by reference in its entirety.

BACKGROUND

The present disclosure generally relates to methods for fracturing subterranean formations. In particular, the present disclosure relates to methods of fracturing subterranean formations with a first fluid including natural gas and a second fluid foamed with natural gas.

Hydrocarbon assets, such as oil and natural gas, are often found underground in tight geological formations, such as sandstone or shale. These require unconventional drilling and completion techniques, including the fracturing of the geological strata that contain the hydrocarbons to allow those hydrocarbons to be released for recovery, treatment, storage and distribution.

Subterranean wells are often stimulated by hydraulic fracturing treatments. In hydraulic fracturing treatments, a fracturing fluid, which also functions as a carrier fluid, is pumped into a portion of a subterranean formation at a rate and pressure such that the subterranean formation breaks down and one or more fractures are formed. Typically, particulate solids, such as graded sand, are suspended in a portion of the fracturing fluid and are then deposited in the fractures. These particulate solids, or "proppant particulates," serve to prevent the fractures from fully closing once the hydraulic fracturing pressure is released. By keeping the fracture from fully closing, the proppant particulates aid in forming conductive paths through which fluids may flow.

Shale reservoirs are hydrocarbon reservoirs formed in a shale formation. Shale formations have very low permeability so complex fractures (with more stimulated surfaces) are particularly desirable in hydraulic fracturing in shale. Studies have shown that low viscosity fluid offers higher fracture complexity to effectively increase fracture density and generate more open surface area for hydrocarbon desorption. Fracturing with low viscosity gas offers such benefits, and nitrogen and carbon dioxide have been pumped to fracture shale formations. Their application, however, poses significant logistic challenges. Compressed or liquefied nitrogen ($N_2$) or carbon dioxide ($CO_2$), and special equipment need to be in place to perform such fracturing treatments. Another problem associated with gas fracturing fluids is that they do not have a high enough viscosity to effectively transport proppant particulates during injection or to overcome proppant settling.

Thus, there is a continuing need for improved methods for fracturing subterranean formations, and particularly fracturing unconventional formations, such as shale formations.

BRIEF DESCRIPTION OF THE DRAWINGS

The following figures are included to illustrate certain aspects of the present disclosure, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

According to several exemplary embodiments, methods are provided for fracturing subterranean formations using a hybrid stimulation treatment. According to several exemplary embodiments, the hybrid stimulation treatment includes fracturing the formation with a first fluid that includes natural gas, and then introducing a second fluid that is a foamed aqueous fluid with proppant particulates into the subterranean formation. According to several exemplary embodiments, the foamed aqueous fluid includes an internal natural gas phase. According to several exemplary embodiments, the foamed aqueous fluid is a foamed aqueous gel. According to several exemplary embodiments, the foamed aqueous fluid is cross-linked. According to several exemplary embodiments, the subterranean formation is an unconventional formation, such as shale.

As used herein, "proppants" or "proppant particulates" refer to any material or formulation that can be used to hold open or prop open at least a portion of a fracture network. The portion of the fracture network that may be propped open may include any such portion of the fracture network including the primary fracture, secondary fractures, tertiary fractures, and quaternary fractures. It should be understood that the term "proppant" and derivatives thereof as used in this disclosure, include all known shapes of materials, including substantially spherical materials, low to high aspect ratio materials, cylindrical materials, fibrous materials, polygonal materials (such as cubic materials), and mixture thereof.

According to several exemplary embodiments, pressurized or liquefied natural gas is first pumped downhole to initiate complex fractures in the formation. After creation of the complex fractures, the foamed aqueous fluid with proppant particulates is pumped downhole to prop open the complex fractures. Advantageously, the combination of natural gas and the foamed aqueous fluid provides both complex fractures and effective proppant transportation and placement in the complex fractures.

As used herein, "natural gas" means methane ($CH_4$) alone or blends of methane with other gases such as other gaseous hydrocarbons. Natural gas is often a variable mixture of about 85% to 95% $CH_4$ and 2% to 9% ethane ($C_2H_6$), with further decreasing components of propane ($C_3H_8$), butane ($G_4H_{10}$), and pentane ($C_5H_{12}$), with traces of longer chain hydrocarbons.

As used herein, a "complex fracture" refers to a fracture having interconnecting fractures, which may include a primary fracture, secondary branch fractures, tertiary branch fractures, and quaternary branch fractures. In some formations like shale, the primary fracture can further branch into other fractures; all extending through either a direct branch or indirect branch from the primary fracture and creating a complex fracture network. A complex fracture network encompasses the primary fracture and any and all branching fractures, regardless of their size, man-made or otherwise, within a subterranean formation that are in fluid communication with the access conduit and/or wellbore.

According to several exemplary embodiments, a method of fracturing a subterranean formation containing a hydrocarbon is provided. According to several exemplary embodiments, the method includes introducing, for example pumping, a first fracturing fluid that includes natural gas into the formation at a rate and pressure sufficient to create a complex fracture in the formation; introducing, for example pumping, a second fracturing fluid into the formation, wherein the second fracturing fluid includes water, a gelling agent, natural gas, a foaming agent, and proppant particulates; and allowing the second fracturing fluid to transport a portion of the proppant particulates into the complex fracture.

According to several exemplary embodiments, the second fracturing fluid is introduced into the formation after the first fracturing fluid. According to several exemplary embodiments, the method further includes introducing a fluid at a rate and pressure sufficient to create a primary fracture in the formation before introducing the first fracturing fluid into the formation. The fluid includes a slickwater fluid or a foamed fluid.

According to several exemplary embodiments, the second fracturing fluid includes a foamed aqueous fluid. That is, the foamed aqueous fluid is formed at the surface and subsequently introduced into the formation.

According to several exemplary embodiments, the second fracturing fluid generates foam in-situ, for example, right before passing through perforations. The second fracturing fluid may be a foamable fluid or a pre-foam fluid. According to several exemplary embodiments, the water, gelling agent, foaming agent, natural gas, and proppant particulates are mixed under conditions that dissolve the natural gas in the fluid to form a foamable fluid. This foamable fluid is capable of being introduced directly into the drill string through conventional pumps. When the foamable fluid undergoes a pressure drop (such as what happens in the drill bit) or via mixing inside the tubulars during pumping, the foamable fluid spontaneously converts to a foamed fluid.

According to several exemplary embodiments, the first fracturing fluid or second fracturing fluid further includes $CO_2$ or $N_2$. For example, the first fracturing fluid may be a mixture of natural gas and $CO_2$, natural gas and $N_2$ or natural gas, $CO_2$ and $N_2$.

According to several exemplary embodiments, the second fracturing fluid is a foamed aqueous gel, which may or may not be cross-linked. According to several exemplary embodiments, the second fracturing fluid further includes a cross-linking agent. According to several exemplary embodiments, the second fracturing fluid has a viscosity greater than about 20 centipoise.

According to several exemplary embodiments, the water in the second fracturing fluid includes fresh water or salt water.

According to several exemplary embodiments, a pump is used to introduce the first fracturing fluid or the second fracturing fluid into the formation.

According to several exemplary embodiments, the formation is an unconventional formation, such as shale.

According to several exemplary embodiments, the method further includes allowing the natural gas to diffuse into the formation to reduce the viscosity of the hydrocarbon in the formation.

According to several exemplary embodiments, the natural gas in the second fracturing fluid is present in an amount of about 50% by volume to about 90% by volume fraction in the second fracturing fluid.

According to several exemplary embodiments, the gelling agent is present in an amount of about 0.01% to about 2% by weight of the water, the cross-linking agent is present in an amount of about 0.01% to about 1% by weight of the water, the foaming agent is present in an amount of about 0.05% to about 2% by weight of the liquid component of the second fracturing fluid, the natural gas is present in an amount of about 60% to about 85% by volume fraction of the second fracturing fluid, and the proppant particulates are present in an amount of about 0.1 to about 12 pounds of proppant particulates per gallon of the second fracturing fluid.

Figure 1:
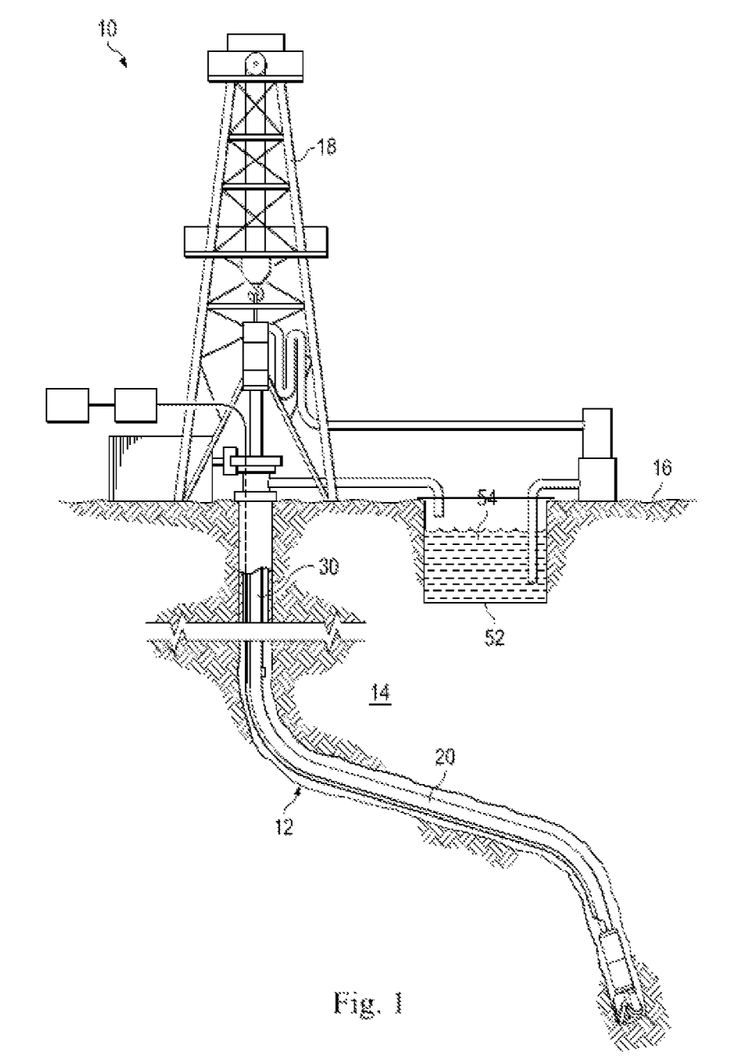
FIG. 1 illustrates a land-based drilling and production system.

Turning now to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in wellbore operations, including without limitation, drilling fluid, slurry, acidizing fluid, liquid water, steam, hydraulic fracturing fluid, propane, nitrogen, carbon dioxide, natural gas, or some other type of fluid. According to several exemplary embodiments, working fluid 54 includes natural gas.

According to several exemplary embodiments, a fluid is first introduced into the subterranean formation to create a main or primary fracture of desirable size. According to several exemplary embodiments, the fluid includes a low viscosity fluid such as a slickwater fluid (<10 cPs) or a higher viscosity fluid such as a foamed fluid (e.g., an aqueous fluid foamed with natural gas, but without carrying proppant particulates).

According to several exemplary embodiments, after the fluid is introduced, a first fracturing fluid having a low viscosity is introduced into the subterranean formation to generate fracture complexity branching out from the primary fracture. As used herein, "low viscosity" mean less than about 1 centipoise (cP) or less than about 0.5 cP. The term "introducing" or its variations, as used herein, includes pumping, injecting, pouring, releasing, displacing, spotting, circulating, or otherwise placing a fluid or material within a well, wellbore, or subterranean formation using any suitable manner known in the art.

According to several exemplary embodiments, the first fracturing fluid includes natural gas. According to several exemplary embodiments, the first fracturing fluid is natural gas, a natural gas/$CO_2$ mixture, natural gas/$N_2$ mixture, or a natural gas, $CO_2$ and $N_2$ mixture. According to several exemplary embodiments, the amount of natural gas in the gas mixtures is greater than 70 percent by volume.

The use of a low viscosity fluid promotes fracture complexity by increasing the created fracture surface area and by increasing the fracture density in the reservoir. The low viscosity fluid provides increased fracture network complexity and enhanced oil recovery.

Communication between the primary fracture and the remainder of the corresponding complex fracture network is an important factor for maximizing production from the formation. Shale and other low permeability formations may be difficult to fracture and may require repeated fracturing attempts in order to create an adequate fracture network for the production of hydrocarbons. Without adequate fracturing of the formation, these formations may exhibit a steep production decline, where the formation produces hydrocarbons for a shorter amount of time. Recovering a well after production decline typically involves refracturing, which can be costly and time consuming.

Advantageously, fracturing with gas, such as natural gas, gives higher fracture complexity than fracturing with slick-water fracturing fluids or conventional cross-linked fluids. Slick-water fracturing creates large fractures, but the low viscosity of the fluids provides poor proppant transportation, resulting in large portions of unpropped fractures. Conventional cross-linked fracturing fluids give the best proppant placement, but do not generate complex fractures.

Another benefit of using natural gas is that the introduced natural gas potentially penetrates into formation pores or microfractures and dissolves in the hydrocarbon to lower the hydrocarbon's viscosity, making it easier to flow out of the formation. This yields faster and higher hydrocarbon recovery.

Fracturing with natural gas also results in reduced water usage. Large amounts of water can be saved, and water related formation damage, such as clay swelling, fines migration and water blocks can be prevented.

Furthermore, natural gas and mixtures of natural gas (e.g., a natural gas/$CO_2$ mixture) are more readily available at most oilfield locations than pure $CO_2$ or $N_2$. Thus, the use of natural gas offers logistical advantages over both $N_2$ and $CO_2$ alone.

Natural gas alone (or a mixture of natural gas), however, is very poor in proppant transportation. Because natural gas cannot carry proppant effectively, a second fracturing fluid to carry proppant particulates is introduced into the formation. A second fracturing fluid with higher viscosity than the first fracturing fluid and capable of carrying proppant particulates into the created complex fractures will take full advantage of fracture complexity and proppant placement.

According to several exemplary embodiments, a second fracturing fluid having a higher viscosity than the first fracturing fluid is introduced into the formation after creation of the complex fractures. As used herein, "higher viscosity" means greater than about 20 cP, for example, 200 cP, 300 cP, or 400 cP.

According to several exemplary embodiments, the second fracturing fluid is a foamed aqueous fluid, such as a foamed aqueous gel, which may or may not be cross-linked. Foamed fluids are media in which a relatively large volume of gas is dispersed, or encapsulated, in a relatively small volume of liquid, usually with the aid of a surfactant, known as a foamer or a foaming agent, which reduces the surface tension of the fluids. According to several exemplary embodiments, natural gas or a mixture containing natural gas is used in the foamed aqueous fluid.

According to several exemplary embodiments, the second fracturing fluid is a foamable fluid that is capable of producing a foam after the foamable fluid is introduced into the formation. According to several exemplary embodiments, the foamable fluid is prepared by dissolving natural gas in a mixture of water, a gelling agent, a foaming agent, and proppant particulates. The foamable fluid is then introduced into the formation and allowed to produce a foam when the foamable fluid undergoes a pressure drop sufficient to produce the foam or by the mixing caused by the turbulence inside of the tubulars during pumping.

According to several exemplary embodiments, the gas utilized for forming the second fracturing fluid is present in an amount sufficient to foam the second fracturing fluid. According to several exemplary embodiments, the gas is present in an amount of about 20% to about 90% by volume of the second fracturing fluid therein. According to several exemplary embodiments, the gas is present in an amount of about 50% to about 90% by volume of the second fracturing fluid therein. According to several exemplary embodiments, the gas is present in an amount of about 50% to 95% by volume of the second fracturing fluid therein.

According to several exemplary embodiments, the second fracturing fluid includes water, proppant particulates, a foaming agent, a gelling agent for gelling the water and increasing its viscosity, and optionally a cross-linking agent for cross-linking the gelling agent and further increasing the viscosity of the second fracturing fluid. The increased viscosity of the gelled, or gelled and cross-linked, second fracturing fluid reduces fluid loss and allows the second fracturing fluid to transport significant quantities of suspended proppant particulates. The water used to form the second fracturing fluid may be fresh water, salt water, brine, or any other aqueous liquid that does not adversely react with the other components. The density of the water can be increased to provide additional proppant transport and suspension.

According to several exemplary embodiments, a variety of gelling agents are used, including hydratable polymers that contain one or more functional groups such as hydroxyl, carboxyl, sulfate, sulfonate, phosphate, phosphonate, amino, or amide groups. Suitable gelling agents typically include biopolymers, synthetic polymers, or a combination thereof. According to several exemplary embodiments, the gelling agents may include biopolymers including polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar (HPG) and carboxymethyl hydroxypropyl guar (CMHPG), and cellulose derivatives, such as hydroxyethyl cellulose (HEC), carboxymethyl hydroxyethyl cellulose (CMHEC). Additionally, synthetic polymers and copolymers that contain the above-mentioned functional groups may be used.

Examples of such synthetic polymers include, but are not limited to, polyacrylate, polymethacrylate, polyacrylamide, polyvinyl alcohol, polyvinylpyrrolidone and their copolymers. Suitable gelling agents generally are present in the second fracturing fluid in an amount in the range of from about 0.01% to about 5% by weight of the water therein. According to several exemplary embodiments, the gelling agents are present in the second fracturing fluid in an amount in the range of from about 0.1% to about 2% by weight of the water therein.

According to several exemplary embodiments, cross-linking agents may be used to cross-link gelling agent molecules to form cross-linked gelling agents. Cross-linkers typically include at least one metal that is capable of cross-linking at least two gelling agent molecules. Examples of suitable cross-linkers include, but are not limited to, zirconium compounds (such as, for example, zirconium lactate, zirconium triethanolamine, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. The cross-linker also may include a boron containing compound. Examples of suitable boron-containing cross-linkers include, but are not limited to, boric acid, disodium octaborate tetrahydrate, sodium diborate, pentaborates, ulexite and colemanite. Suitable cross-linkers generally are present in the foamed aqueous fluid in an amount sufficient to provide the desired degree of cross-linking between gelling agent molecules. According to several exemplary embodiments, the cross-linkers are present in an amount in the range of from about 0.001% to about 10% by weight of the water in the second fracturing fluid. According to several exemplary embodiments, the cross-linkers are present in the second fracturing fluid in an amount in the range of from about 0.01% to about 1% by weight of the water therein. Persons of ordinary skill in the art, with the benefit of this disclosure, will recognize the exact type and amount of cross-linker to use depending on factors such as the specific gelling agent, desired viscosity, and formation conditions.

According to several exemplary embodiments, the gelled or gelled and cross-linked second fracturing fluids may also include internal delayed gel breakers such as an enzyme, oxidizer, acid buffer, or temperature-activated gel breakers. The gel breakers cause the viscous carrier fluids to revert to thin fluids that can be produced back to the surface after they have been used to place proppant particulates in subterranean fractures. According to several exemplary embodiments, the gel breaker used is typically present in the second fracturing fluid in an amount of from about 0.25% to about 10% by weight of the gelling agent. The second fracturing fluid may also include one or more of a variety of well-known additives, such as gel stabilizers, fluid loss control additives, clay stabilizers, surfactants, scale inhibitors, $H_2S$ scavengers, oil/water soluble tracers and bactericides.

According to several exemplary embodiments, the second fracturing fluid further includes proppant particulates. The proppant particulates hold the complex fracture network open, thereby maintaining the ability for hydrocarbons to flow through the complex fracture network to ultimately be produced at the surface.

According to several exemplary embodiments, any proppant particulate suitable for use in subterranean applications is suitable for use in the methods of the present disclosure. For instance, natural sand, ground walnut hulls, man-made proppants, including bauxite, ceramics, or polymeric materials, are suitable. Suitable sizes range from 4 to 600 U.S. mesh, for example in the range of 10 to 100 U.S. mesh. According to several exemplary embodiments, the proppant particulates may be coated with a curable resin. According to several exemplary embodiments, the proppant particulates are generally present in the second fracturing fluid in an amount of about 0.1 to about 12 pounds of proppant particulates per gallon of the second fracturing fluid.

According to several exemplary embodiments, the second fracturing fluid includes a surfactant, or foaming agent, to promote and stabilize the foam in the second fracturing fluid. The surfactants used are generally soap-like molecules containing a long hydrophobic hydrocarbon chain with a hydrophilic end group. Surfactants include cationic, anionic, nonionic or amphoteric compounds such as for example, betaines, sulfated or sulfonated alkoxylates, alkyl quarternary amines, alkoxylated linear alcohols, alkyl sulfonates, alkyl aryl sulfonates, and $C_{10}$-$C_{20}$ alkyldiphenyl ether sulfonates. Suitable surfactants include for example polyethylene glycol ethers of alkylated phenol, sodium dodecylsulfate, alpha olefin sulfonates such as sodium dodecanesulfonate and trimethyl hexadecyl ammonium bromide. Surfactants are added in concentrations which range typically from about 0.05 to about 2% of the liquid component of the second fracturing fluid by weight (from about 0.5 to about 20 gallons per 1000 gallons of liquid).

Foamed or foamable aqueous fluids are superior to conventional liquid fracturing fluids for problematic and water sensitive formations because foams contain less liquid than liquid fracturing fluids and have less tendency to leak into the formation. Also, foams have less liquid to retrieve after the fracturing operation is complete. In addition, the natural gas in the second fracturing fluid will diffuse into the formation and dissolve in the hydrocarbons (e.g., crude oil) to lower the hydrocarbon's viscosity, making it easier to produce. Moreover, the sudden expansion of the gas in the formation when pressure in the well is relieved after the fracturing operation is complete promotes flow of residual fracture fluid liquid back into the well and provides pressure for hydrocarbon production.

Figure 2:
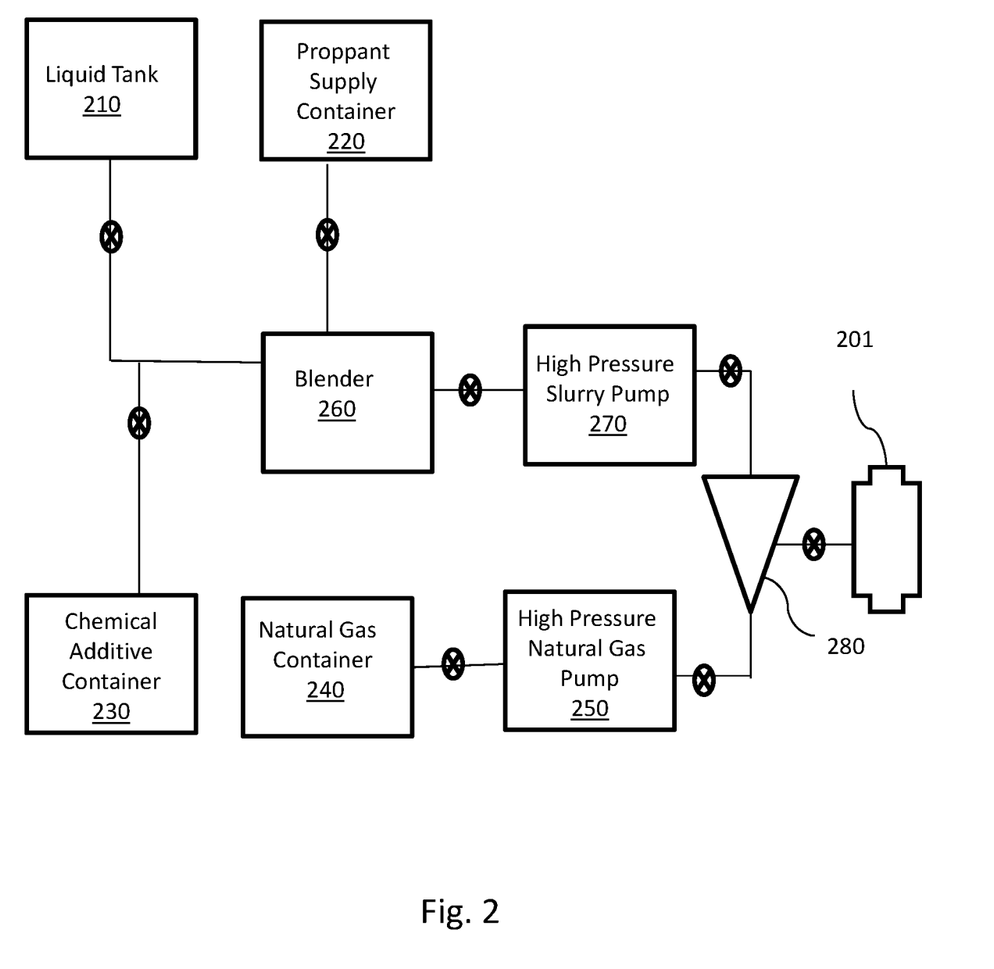
FIG. 2 is a schematic of a system for use in the methods according to one or more embodiments of the present disclosure.

FIG. 2 is a schematic depiction of the main components of an exemplary system 200 that may be used to provide natural gas and a foamed or foamable aqueous fluid to a subterranean formation. An aqueous base fluid is stored in a liquid tank 210, proppant is stored in a proppant supply container 220, and additives such as a gelling agent and/or cross-linking agent are stored in a chemical additive container 230. Natural gas is stored in a natural gas container 240. A natural gas stream is pressurized and supplied by a high pressure natural gas pump 250 and enters a mixer 280 via a conduit. As used herein, "high pressure" means at least about 35 MPa and up to as high as about 100 MPa. For instance, the "high pressure natural gas pump" supplies natural gas at pressures of at least about 35 Mpa to about 100 Mpa. The natural gas stored in container 240 can be compressed natural gas or liquefied natural gas. The high pressure natural gas pump 250 is a compressor if compressed natural gas is the source or a specialized liquefied natural gas fracturing pump if liquefied natural gas is the source. The output from the high pressure natural gas pump 250, regardless of the state of the source gas, is in a gaseous state. The blender 260 receives the aqueous base fluid from liquid tank 210 and chemical additives from chemical additive container 230, and blends proppant particulates from proppant supply container 220 to form a slurry. The slurry is then transported from the blender 260 to a high pressure slurry pump 270. The high pressure slurry pump 270 is connected to the mixer 280.

According to several exemplary embodiments, the natural gas stream from the natural gas container 240 can enter a well 201 via a conduit where it travels down the wellbore to the reservoir to create complex fractures. According to several exemplary embodiments, the natural gas stream may be combined with $CO_2$, $N_2$ or any other suitable gas before entering the well 201.

According to several exemplary embodiments, once the complex fractures are created, the natural gas stream is combined with the slurry from high pressure slurry pump 270 within the mixer 280, to form a foamed or foamable aqueous fluid. This foamed or foamable aqueous fluid can include the aqueous base fluid, chemical additives, and proppant particulates. The foamed or foamable aqueous fluid then enters the well 201 via a conduit where it travels down the wellbore to the reservoir to prop open the created complex fractures.

Figure 3:
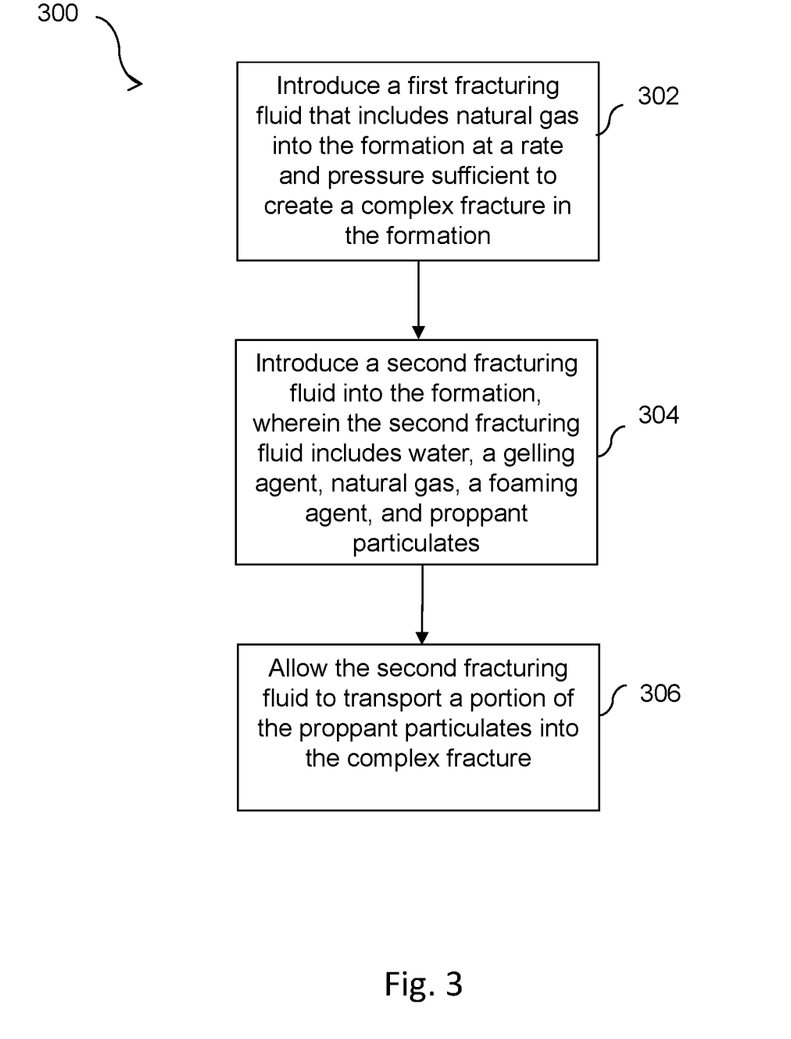
FIG. 3 depicts a method of fracturing a subterranean formation according to one or more embodiments of the present disclosure.

According to several exemplary embodiments, a method of fracturing a subterranean formation is provided. Turning now to FIG. 3, the method 300 includes introducing a first fracturing fluid that includes natural gas into the formation at a rate and pressure sufficient to create a complex fracture in the formation in step 302; introducing a second fracturing fluid into the formation, wherein the second fracturing fluid includes water, a gelling agent, natural gas, a foaming agent, and proppant particulates in step 304; and allowing the second fracturing fluid to transport a portion of the proppant particulates into the complex fracture at step 306.

According to several exemplary embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes and/or procedures may be merged into one or more steps, processes and/or procedures. In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of fracturing a subterranean formation containing a hydrocarbon, comprising:
   introducing a first fracturing fluid comprising natural gas into the subterranean formation at a rate and pressure sufficient to create a complex fracture in the subterranean formation, wherein the first fracturing fluid has a viscosity of less than about 1 centipoise and the natural gas in the first fracturing fluid comprises about 85% to 95% methane and about 2% to 9% ethane;
   introducing a second fracturing fluid into the subterranean formation, wherein the second fracturing fluid comprises water, a gelling agent, a natural gas, a foaming agent, and proppant particulates, wherein the natural gas in the second fracturing fluid comprises about 85% to 95% methane and about 2% to 9% ethane, and the natural gas in the second fracturing fluid is present in an amount of about 50% by volume to about 90% by volume fraction in the second fracturing fluid; and
   allowing the second fracturing fluid to transport a portion of the proppant particulates into the complex fracture.

2. The method of claim 1, further comprising before introducing the first fracturing fluid, introducing a slickwater fluid or a foamed fluid into the subterranean formation at a rate and pressure sufficient to create a primary fracture in the subterranean formation.

3. The method of claim 1, wherein the first fracturing fluid or second fracturing fluid further comprises carbon dioxide gas, nitrogen gas, or a carbon dioxide/nitrogen gas mixture.

4. The method of claim 1, wherein the second fracturing fluid further comprises a cross-linking agent.

5. The method of claim 1, wherein the water comprises fresh water or salt water.

6. The method of claim 1, wherein a pump is used to introduce the first fracturing fluid or the second fracturing fluid into the subterranean formation.

7. The method of claim 1, wherein the subterranean formation comprises shale.

8. The method of claim 1, wherein the second fracturing fluid has a viscosity greater than about 20 centipoise.

9. The method of claim 1, further comprising allowing the natural gas in the first fracturing fluid or in the second fracturing fluid to diffuse into the subterranean formation to reduce a viscosity of the hydrocarbon.

10. The method of claim 1, wherein:
    the second fracturing fluid further comprises a cross-linking agent, and
    the gelling agent is present in an amount of about 0.01% to about 2% by weight of the water, the foaming agent is present in an amount of about 0.05% to about 2% by weight of liquid component of the second fracturing fluid, the cross-linking agent is present in an amount of about 0.01% to about 1% by weight of the water, the natural gas is present in an amount of about 60% to about 85% by volume fraction of the second fracturing fluid, and the proppant particulates are present in an amount of about 0.1 to about 12 pounds of proppant particulates per gallon of the second fracturing fluid.

11. A method of fracturing a subterranean formation containing a hydrocarbon, comprising:
    pumping a first fracturing fluid comprising natural gas into the subterranean formation at a rate and pressure sufficient to create a complex fracture in the subterranean formation, wherein the first fracturing fluid has a viscosity of less than about 1 centipoise and the natural gas in the first fracturing fluid comprises about 85% to 95% methane and about 2% to 9% ethane;
    after pumping the first fracturing fluid into the subterranean formation, pumping a second fracturing fluid having a viscosity greater than about 20 centipoise into the subterranean formation, wherein the second fracturing fluid comprises water, a gelling agent, a foaming agent, a natural gas, and proppant particulates, the natural gas in the second fracturing fluid comprises about 85% to 95% methane and about 2% to 9% ethane, and the natural gas in the second fracturing fluid is present in an amount of about 50% by volume to about 90% by volume fraction in the second fracturing fluid; and
    allowing the second fracturing fluid to transport a portion of the proppant particulates into the complex fracture.

12. The method of claim 11, further comprising before introducing the first fracturing fluid, introducing a slickwater fluid or a foamed fluid into the subterranean formation at a rate and pressure sufficient to create a primary fracture in the subterranean formation.

13. The method of claim 11, wherein the first fracturing fluid or the second fracturing fluid further comprises carbon dioxide gas, nitrogen gas, or a carbon dioxide/nitrogen gas mixture.

14. The method of claim 11, further comprising allowing the natural gas in the first fracturing fluid or in the second fracturing fluid to diffuse into the subterranean formation to reduce a viscosity of the hydrocarbon.

15. The method of claim 11, wherein:
the second fracturing fluid further comprises a cross-linking agent, and
the gelling agent is present in an amount of about 0.01% to about 2% by weight of the water, the foaming agent is present in an amount of about 0.05% to about 2% by weight of liquid component of the second fracturing fluid, the cross-linking agent is present in an amount of about 0.01% to about 1% by weight of the water, the natural gas is present in an amount of about 60% to about 85% by volume fraction of the second fracturing fluid, and the proppant particulates are present in an amount of about 0.1 to about 12 pounds of proppant particulates per gallon of the second fracturing fluid.

16. A method of fracturing a shale formation containing a hydrocarbon, comprising:
introducing a first fracturing fluid comprising natural gas into the shale formation at a rate and pressure sufficient to create a complex fracture in the shale formation, wherein the first fracturing fluid has a viscosity of less than 1 centipoise and the natural gas in the first fracturing fluid comprises about 85% to 95% methane and about 2% to 9% ethane;
after introducing the first fracturing fluid, introducing a second fracturing fluid into the shale formation, wherein the second fracturing fluid comprises water, a gelling agent, a foaming agent, a cross-linking agent, a natural gas, and proppant particulates, wherein the natural gas in the second fracturing fluid comprises about 85% to 95% methane and about 2% to 9% ethane, and the natural gas in the second fracturing fluid is present in an amount of about 50% by volume to about 90% by volume fraction in the second fracturing fluid; and
allowing the second fracturing fluid to transport a portion of the proppant particulates into the complex fracture.

17. The method of claim 16, wherein the first fracturing fluid or the second fracturing fluid further comprises carbon dioxide gas, nitrogen gas, or a carbon dioxide/nitrogen gas mixture.

18. The method of claim 16, wherein the second fracturing fluid has a viscosity greater than about 20 centipoise.

19. The method of claim 16, wherein the gelling agent is present in an amount of about 0.01% to about 2% by weight of the water, the foaming agent is present in an amount of about 0.05% to about 2% by weight of liquid component of the second fracturing fluid, the cross-linking agent is present in an amount of about 0.01% to about 1% by weight of the water, the natural gas is present in an amount of about 60% to about 85% by volume fraction of the second fracturing fluid, and the proppant particulates are present in an amount of about 0.1 to about 12 pounds of proppant particulates per gallon of the second fracturing fluid.

20. The method of claim 16, further comprising allowing the natural gas in the first fracturing fluid or the second fracturing fluid to diffuse into the shale formation to reduce a viscosity of the hydrocarbon.

* * * * *